US009483693B1

(12) United States Patent
de Menezes Pereira et al.

(10) Patent No.: US 9,483,693 B1
(45) Date of Patent: Nov. 1, 2016

(54) FREE-HAND CHARACTER RECOGNITION ON A TOUCH SCREEN POS TERMINAL

(71) Applicant: Clover Network, Inc., Sunnyvale, CA (US)

(72) Inventors: Arvind Antonio de Menezes Pereira, Sunnyvale, CA (US); John Daniel Beatty, Emerald Hills, CA (US)

(73) Assignee: Clover Network, Inc., Sunnyvale, CA (US)

( * ) Notice: Subject to any disclaimer, the term of this patent is extended or adjusted under 35 U.S.C. 154(b) by 0 days.

(21) Appl. No.: 14/952,838

(22) Filed: Nov. 25, 2015

(51) Int. Cl.
| | |
|---|---|
| *G06K 9/00* | (2006.01) |
| *G06F 3/0488* | (2013.01) |
| *G06K 9/46* | (2006.01) |
| *G06K 9/48* | (2006.01) |
| *G06K 9/62* | (2006.01) |
| *G06K 7/08* | (2006.01) |
| *G06Q 20/20* | (2012.01) |
| *G06Q 20/40* | (2012.01) |

(52) U.S. Cl.
CPC ....... *G06K 9/00416* (2013.01); *G06F 3/04883* (2013.01); *G06K 7/082* (2013.01); *G06K 9/4647* (2013.01); *G06K 9/481* (2013.01); *G06K 9/6256* (2013.01); *G06Q 20/204* (2013.01); *G06Q 20/208* (2013.01); *G06Q 20/405* (2013.01); *G06Q 20/4014* (2013.01)

(58) Field of Classification Search
None
See application file for complete search history.

(56) References Cited

U.S. PATENT DOCUMENTS

| | | | |
|---|---|---|---|
| 5,589,855 A | 12/1996 | Blumstein et al. | |
| 5,832,100 A | 11/1998 | Lawton et al. | |
| 6,351,634 B1 | 2/2002 | Shin | |
| 6,917,902 B2 * | 7/2005 | Alexander | G06F 19/3418 382/118 |
| 7,644,039 B1 | 1/2010 | Magee et al. | |
| 8,108,318 B2 * | 1/2012 | Mardikar | G06Q 20/1085 340/5.2 |
| 9,202,035 B1 * | 12/2015 | Manusov | G06F 21/36 |

(Continued)

FOREIGN PATENT DOCUMENTS

| | | | |
|---|---|---|---|
| JP | 2004-215733 | * | 7/2004 |
| WO | 9827533 A2 | | 6/1998 |

*Primary Examiner* — Manav Seth
*Assistant Examiner* — David Perlman
(74) *Attorney, Agent, or Firm* — The Mueller Law Office, P.C.

(57) ABSTRACT

Various methods and devices that involve character recognition on a touch display, or other input device, are disclosed. Some of these may facilitate the recognition of characters that are input by people with physical impairments such as those with limited eyesight. A disclosed free-hand character recognition device comprises: an input device having stroke detection circuitry to accept input data from a user; a character recognition engine instantiated using a processing system and a data store; and a network connection to a server. The device additionally comprises a memory storing instructions to: conduct an unobtrusive user recognition procedure to obtain a user identifier from the user; download a cipher from the server to the data store using the network connection and the user identifier; and generate a prediction vector using the character recognition engine, the input data, and the cipher.

24 Claims, 7 Drawing Sheets

(56) References Cited

U.S. PATENT DOCUMENTS

| | | | |
|---|---|---|---|
| 2003/0012374 A1* | 1/2003 | Wu | H04L 9/3247 380/44 |
| 2003/0048948 A1 | 3/2003 | Confer et al. | |
| 2006/0282660 A1 | 12/2006 | Varghese et al. | |
| 2007/0005537 A1* | 1/2007 | Abdulkader | G06K 9/00429 706/20 |
| 2008/0155402 A1 | 6/2008 | Jean et al. | |
| 2008/0316183 A1 | 12/2008 | Westerman et al. | |
| 2009/0178135 A1 | 7/2009 | Dubovsky et al. | |
| 2013/0144731 A1* | 6/2013 | Baldwin | G06Q 20/20 705/17 |
| 2013/0154930 A1* | 6/2013 | Xiang | G06F 3/167 345/158 |
| 2014/0040801 A1 | 2/2014 | Patel et al. | |
| 2014/0270329 A1* | 9/2014 | Rowley | G06K 9/46 382/100 |
| 2016/0034773 A1* | 2/2016 | Goncalves | G06K 9/18 382/103 |

\* cited by examiner

300

FREE-HAND CHARACTER RECOGNITION ON A TOUCH SCREEN POS TERMINAL

BACKGROUND

Over five years ago, more smart phones had touch screens than those that did not. During the course of the following five years leading up to the present day, the global market for touch screens has seen a consistent compound annual growth rate in excess of 10% per year. The explosive growth of the market for touch screens is a testament to their incredible utility and ease of use. As humans are able to operate them before they even learn to speak, they represent one of the most intuitive human-machine interfaces developed to date. However, one set of users has not realized the benefits of this new technology. People that are blind, or are visually impaired, can find touch screens difficult to interact with because there is no haptic feedback provided by the interface, and because there is nothing to distinguish the location where input is to be provided besides a visual cue. Although some modifications, such as increasing the zoom on the screen, have been applied to cater to this set of users, it can sometimes still be next to impossible for them to operate a touch screen interface without assistance from another person.

A point of sale (POS) terminal is an example of an application for a human-machine interface where it is important for an individual user to operate the interface without assistance from another party. This is because POS terminals will often need to accept sensitive information from a user. FIG. 1 displays a POS terminal 100 where input data is received in the form of taps and swipes on touch screen 102. The average user will have no difficulty utilizing user interface 101 to enter their personal identification number (PIN) to authorize a transfer of funds using the POS terminal. However, a visually impaired person will have no way to enter their pin on the user interface 101 because they will not know where the numbers are displayed to accept their selection. In these situations, the user will need to provide their PIN to a clerk verbally which provides a disadvantageous security situation in that both the clerk, and potential eavesdroppers, will be able to obtain the user's PIN.

SUMMARY

FIG. 2 displays a POS terminal 200 that has been adapted to allow users to provide their PIN number to the POS terminal 200 using free-hand drawing in a reserved area of the user interface 201. In contrast to the key pad display of user interface 101, a user of user interface 201 only needs to know the general area on the screen where the characters of their PIN need to be drawn in order to enter their information. If the area on user interface 201 is sufficiently large, a visually impaired person will be able to enter their PIN with little guidance. That guidance can be provided by auditory cues from POS terminal 200 or from a clerk assisting the person with their transaction on the terminal.

Although sighted people may not realize it, free-hand drawing involves a great deal of feedback from the eyes regarding what has already been drawn by any free-hand stroke. Without being able to see what has been drawn, drawing characters on a touch screen that can be recognized by the computer using standard character recognition techniques can be difficult. These difficulties with free-hand drawing extend to other groups besides the visually impaired such as those with motor or nervous disabilities. In addition, the introduction of this alternative method for PIN entry brings in an accompanying additional security concern in that when the characters are drawn in a large space on the screen, they are more susceptible to eavesdropping via over-the-shoulder snooping than the selection of buttons on a small keypad. If a person is using a touch screen POS in a crowded room to enter a PIN, or other secret, they are in danger of having that data stolen. This problem is even more troubling when free hand-drawing is being used as a solution for the visually impaired, because the visually impaired are generally more vulnerable to eavesdropping than the members of the general population. The present disclosure utilizes interface 201 with additional features to provide POS terminal 200 in a condition that provides an adequate user experience to the visually impaired and people with other disabilities.

POS terminal 200 includes a character recognition engine that is designed to recognize a customized set of characters provided via touch screen 201. In certain approaches, the character recognition engine is trained using input from a user that represents the customized characters. It has been found through survey evidence that, although the visually impaired have difficulty inputting characters in free-hand form such that they can be recognized using conventional non-user-specific character recognition engines, they tend to input the characters in such a way that they can be recognized by character recognition engines that have been trained for a specific user. In other words, the survey evidence indicated that the characters have high internal fidelity but are not close matches to how the characters are drawn by the general public. As a result, providing the visually impaired with a personal training procedure used to produce a customized character recognition engine has three related benefits. First, the user is more easily able to operate a touch screen device that accepts free-hand characters. Second, the characters they draw are not easily decipherable to the general public by over-the-shoulder snooping. Third, even if the characters as drawn are detected by over-the-shoulder snooping, they will not be recognized and accepted by the system unless they are paired with the user-specific character recognition engine.

In certain approaches, a character recognition engine operating on the POS terminal is made user-specific through the addition of a user-specific cipher to the POS terminal. For example, a user-specific hypothesis vector can be applied to the character recognition engine to make the character recognition engine user-specific. The hypothesis vector can be the product of a training procedure that is guided by the specific user. The cipher can be provided to the device as part of an unobtrusive user recognition procedure. The procedure must be unobtrusive because otherwise the solution would be less convenient and would degrade the overall user experience for purposes of improving it for a subset of the population. As a result, it would not be adopted for general use, and the visually impaired would not recognize the benefits provided. Sticking with the example of a POS terminal, the unobtrusive recognition procedure can involve reading user-specific data from a personal area network or magnetic stripe card that is specific to the user and is otherwise used as part of the user's interactions with the POS terminal. As a result, the POS terminal can be queued up to interact with the visually impaired person without any additional effort on their part.

This approach has an added benefit for those that are visually impaired. Since the characters are in part difficult to discern for the general population, the overall procedure is not only more convenient but it results in two layers of security: what you know (the particular way in which the person draws the characters); and who you are (the identity found via the unobtrusive user recognition procedure). Although the same process can be used by people without disabilities for an added layer of security, the visually impaired experience an added benefit from this procedure in that the characters they draw are directly matched to the target characters in their heads. In other words, the obfuscation of the characters and commensurate what you know layer of security is derived from an idiosyncratic encoding that they are not, and do not need to be, aware of. There is no need for them to memorize the cipher because the cipher is just an artifact of how they produce characters via free hand drawing.

In one embodiment, a free-hand character recognition device is provided. The device comprises: an input device having stroke detection circuitry to accept input data from a user; a character recognition engine instantiated using a processing system and a data store; and a network connection to a server. The device additionally comprises a memory storing instructions to: conduct an unobtrusive user recognition procedure to obtain a user identifier from the user; download a cipher from the server to the data store using the network connection and the user identifier; and generate a prediction vector using the character recognition engine, the input data, and the cipher.

In another embodiment, a computer-implemented method is provided. The method comprises conducting an unobtrusive user recognition procedure, using a processing system and an input device, to obtain a user identifier from a user. The method also comprises downloading a cipher from a server to a data store, wherein the cipher is provided from the server in exchange for the user identifier obtained in the unobtrusive user recognition procedure, and wherein the cipher uniquely corresponds to the user identifier. The method also comprises accepting input data from the user, using the processing system, a touch screen, and stroke detection circuitry. The method also comprises recognizing, using the processing system, a character recognition engine, the input data, and the cipher, at least two characters entered by the user via the touch screen.

In another embodiment, a POS terminal is provided. The POS terminal comprises a touch screen having stroke detection circuitry to accept input data from a user. The POS terminal also comprises a character recognition engine instantiated using a processing system and a data store. The POS terminal also comprises a network connection to a server. The POS terminal also comprises a memory storing instructions to: conduct a user recognition procedure to obtain a user identifier from the user; download a hypothesis vector from the server to the data store using the network connection and the user identifier; and generate a prediction vector using the character recognition engine, the input data, and the hypothesis vector.

Although the specific example of a POS terminal with a touch screen is used as an example throughout this disclosure, this disclosure is more broadly applicable to any device with a surface or peripheral that receives free-hand drawing inputs from a user. The disclosure is also not limited to any specific touch screen technology and can include capacitive, resistive, and optical touch screens that receive inputs via direct touch or through the use of a specialized input device such as a stylus. These alternative devices can include automated teller machines and access pads via which users provide credentials for access through a physical barrier such as a secured door or turnstile, or a software barrier such as a file access system. Also, as mentioned above, the teachings of this disclosure can be applied to benefit people operating touch screen devices regardless of whether or not they are visually impaired or have other disabilities which cause them to have difficulty operating a touch screen or drawing free-hand characters.

DETAILED DESCRIPTION

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the scope thereof. For instance, features illustrated or described as part of one embodiment may be used with another embodiment to yield a still further embodiment. Thus, it is intended that the present subject matter covers all such modifications and variations within the scope of the appended claims and their equivalents.

Various methods and system for facilitating the secure recognition of characters entered on a free-hand drawing surface or peripheral of a device are described in detail below. The disclosure is broken into three sections.

On-Device Character Recognition Procedure

The methods disclosed are generally executed by a device that receives input data from a user in the form of a free-hand drawing of a character and a server that interacts with the device. The server could be part of, or communicate with, an authorization system that ultimately utilizes characters provided via the input data to transmit an authorization or denial to the device. The actual character recognition procedure that is conducted on the input data can be conducted on the server. In addition, particular benefits accrue to approaches in which the characters are recognized on the device, and data representing the recognized characters are transmitted to the server. In particular approaches, the server will verify that the recognized characters match an authorization password, and provide an authorization back to the device. The device and server will communicate through one or more networks which could include wireless or wired networks, and the Internet. In an example where the device is a POS terminal, the terminal could conduct a character recognition procedure on a series of input data elements representing free-hand drawn numerals, and transmit the recognized numerals to the server. The numerals could be a PIN for which the server will provide an authorization for a payment transaction if the PIN is verified.

Figure 1:
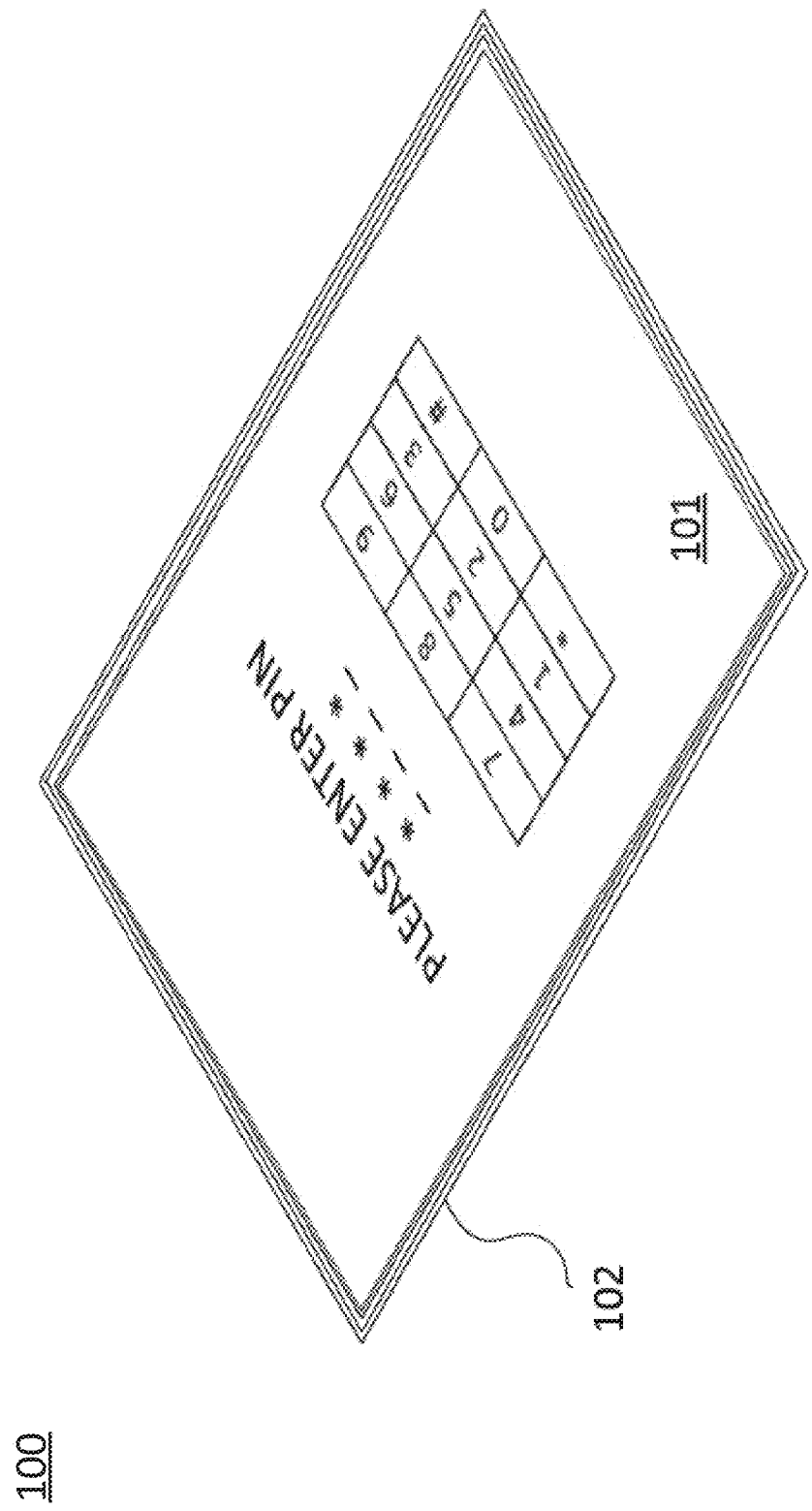
FIG. 1 illustrates a point of sale (POS) terminal with a touch screen that is in accordance with the related art.
Figure 2:
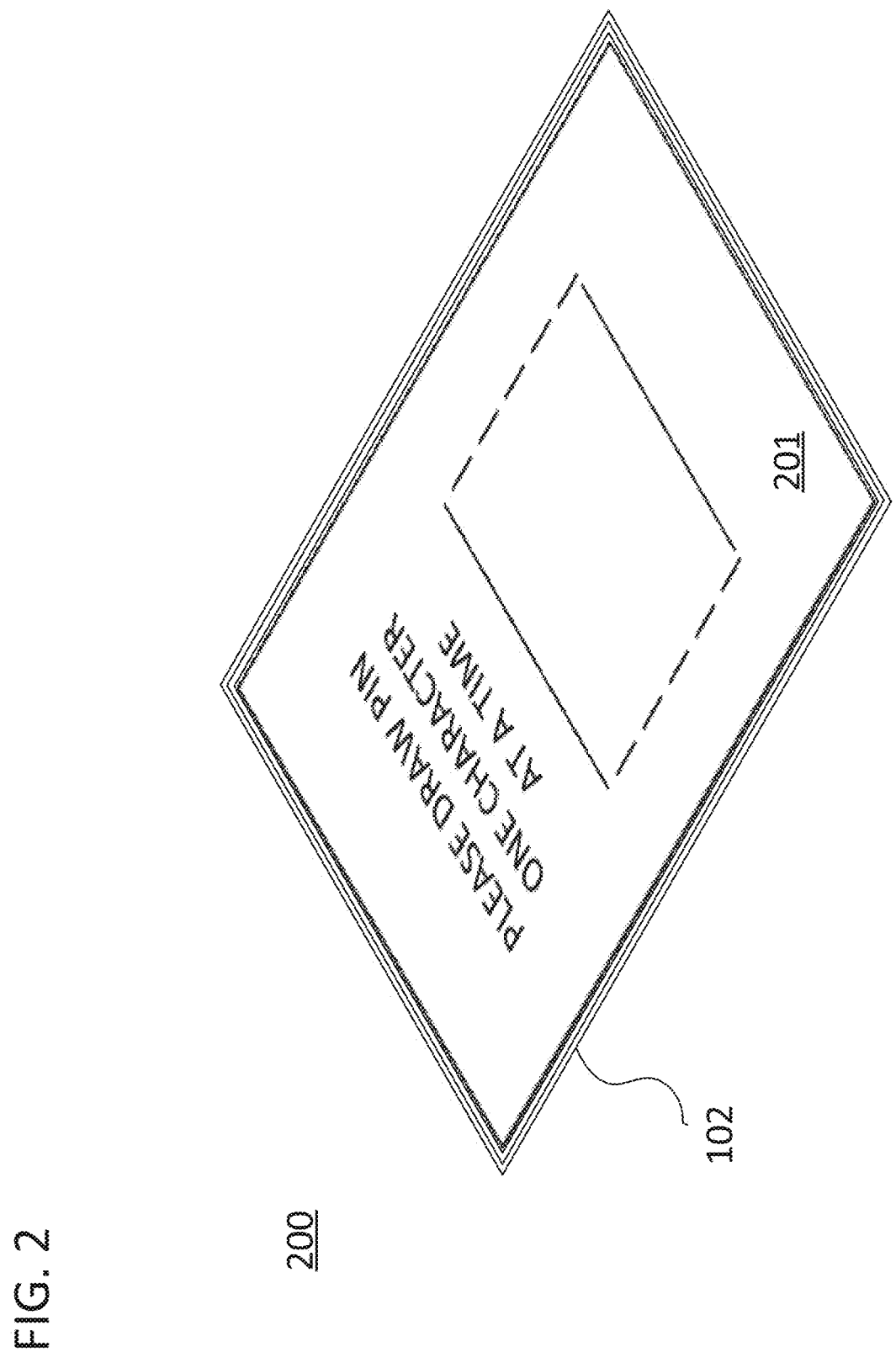
FIG. 2 illustrates a POS terminal with a touch screen that is in accordance with embodiments of the present disclosure.
Figure 3:
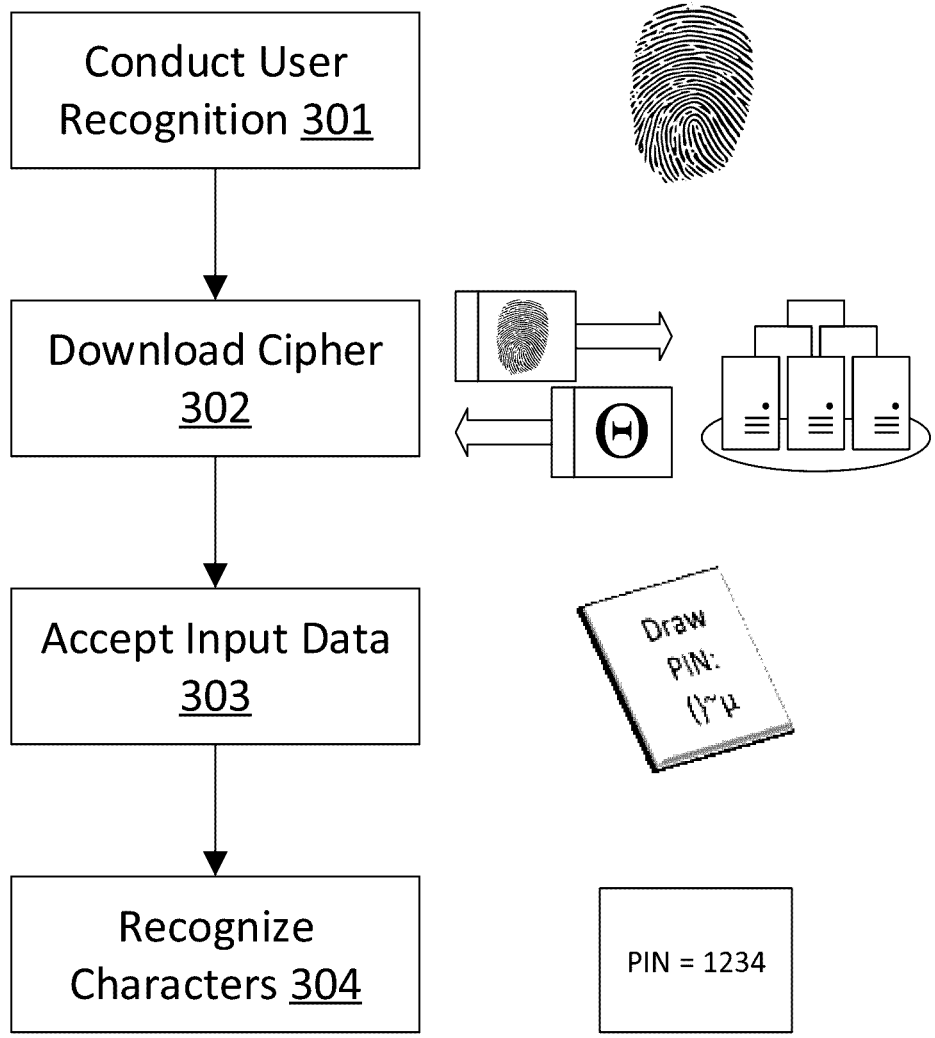
FIG. 3 illustrates a flow chart of a set of methods for recognizing characters entered by a user using a user-specific cipher that is in accordance with embodiments of the present disclosure.

FIG. 3 illustrates a flow chart 300 of methods for recognizing a character entered by a user on a device. The method can be computer-implemented and each step can be executed by a processing system operating in combination with a memory in a single locale on a device. The device can be a POS terminal, such as POS terminal 200, or any other device that requires the entry of secured information via free-hand drawing. Method 300 includes four steps. In step 301, the computer executes an unobtrusive user recognition procedure to obtain a user identifier from a user. In step 302, the computer downloads a cipher from a server to a data store. The data store can be the same memory used by the processing system to execute a method in flow chart 300 or a separate secure memory specifically tasked with storing the cipher. The cipher is provided from the server in exchange for the user identifier obtained in the unobtrusive user recognition procedure of step 301. In step 303, the computer accepts input data from the user using the processing system and a touch screen with stroke detection circuitry. In step 304, the computer recognizes characters in the input data using the processing system, a character recognition engine, and the cipher. The characters include at least two characters in an authorization password for the user, such as two numbers in a PIN.

In a specific example used to illustrate the set of methods that are described by flow chart 300, the characters recognized in step 304 are the numbers from a PIN entered by a blind person or a person with muscle control problems on a touch screen in order to provide approval for a financial transaction. In step 301, the unobtrusive user recognition procedure recognizes the user's fingerprint as the user proceeds through a payment process using the device. The fingerprint as obtained through the aforementioned process serves as the user identifier for which the cipher is provided in step 302. The process is unobtrusive in that the user does not need to take explicit steps beyond what they would otherwise be doing with all else equal besides the execution of the user recognition procedure by the device. For example, the fingerprint recognition procedure could involve detecting the user's fingerprint via a touch screen while the user was placing their finger on the touch screen for other reasons than to engage in the user recognition procedure. Those other reasons could include engaging in the preliminary steps in a checkout procedure prior to payment authorization and transaction approval on a touch screen point of sale device. In another example, interacting with the POS terminal requires a press on a specific button to authorize the transaction, and fingerprint recognition could be built into that button. In step 303, input data in the form of free hand character drawings could be received from the user which could then be used, in combination with the cipher, to recognize the user's PIN to approve the transaction.

The user recognition procedure can take on various other forms besides obtaining a fingerprint from the user. The user recognition procedure can also be conducted by a second user, such as an employee or clerk, assisting the user in the conduct of the financial transaction. For example, the clerk could request an identification document from the first user and upload information from the document using the device or a separate device. The use of a fingerprint obtained via use of the touch screen as described in the previous paragraph is desirable because it is unobtrusive and conducted as part of the ordinary course of interacting with the device, and other approaches feature the same benefit. For example, the user could be recognized via facial recognition software capable of viewing the user's face as they prepare to operate the device. The image could be captured by a camera communicating with or built into the device. Likewise, the user recognition procedure could involve detecting the user's identity via other biometric information such as their fingerprints while grasping the device to operate it, or their voice while communicating with a clerk or auditory cues emanating from the device as part of the overall transaction with the device. Finally, the user recognition procedure could involve pulling data from a card reader or a personal area network communications device that is utilized in the conduct of the overall transaction. For example, the user identification information could be the user's credit card number as read from their card in a magnetic strip reader, as read from their smartphone in an NFC transaction, or detected as part of a beacon signal emanating from their smartphone through any radio protocol. Any user specific information that is otherwise provided in the transaction in the absence of the user recognition procedure could be requisitioned for this purpose. For example, the user identification information could include data sent via an iBeacon on the device that recognized the person via a token previously associated with the user. Depending upon which method is taken, the user identifier uploaded to the server in exchange for the cipher could be raw biometric information, a string of identity information pulled from a magnetic strip, a string of identity information read from an NFC device, or information provided by a clerk via manual entry. Regardless, the data will generally be encrypted locally before being transmitted as described in the following section.

The cipher could be a transform from a set of user defined input characters to a set of characters used by an authorization system to authenticate the user. In this situation, the cipher can be referred to as a user-specific cipher. For example, the set of user defined glyphs could be a personalized alphabet the user created to represent all of the letters in the Standard English alphabet with the cipher providing a mapping between the two alphabets. The same approach could be applied to numerals or any other characters from any given set of commonly known glyphs. As another example, the set of user defined glyphs could be representative of an idiosyncratic way in which a particular user draws a character from a set of commonly known glyphs. As mentioned previously, the manner in which a person with a visual, muscular, or nervous system impairment draws characters from a set of commonly known glyphs could comprise the set of user defined characters.

As a more specific example, the user-specific cipher could be a transform for a character recognition engine used to identify characters from a standard set of alpha-numeric characters from hand-drawn input data. The transform could be used as part of the overall process of converting the raw input data into a concise form of data representing the character—such as an ASCII code or any digital information that can be recognized as the specific character by an authorization system. The raw input data from the user could be stroke data in the form of a set of (x, y, t) coordinates with the "x" and "y" values representing position data for a position on the touch screen, and the "t" coordinate indicating a relative or absolute time at which those elements of position data were received by the touch screen. Alternatively, if a sufficiently capable touch screen was used to collect the touch data, the raw data could also include a 'p' value indicating the amount of pressure being applied to the touch screen at that time. The character recognition engine could use the transform at any stage in the processing of this touch data. In particular, the transform could be a hypothesis vector for the character recognition engine which is used in a hypothesis function to produce a prediction vector.

Figure 4:
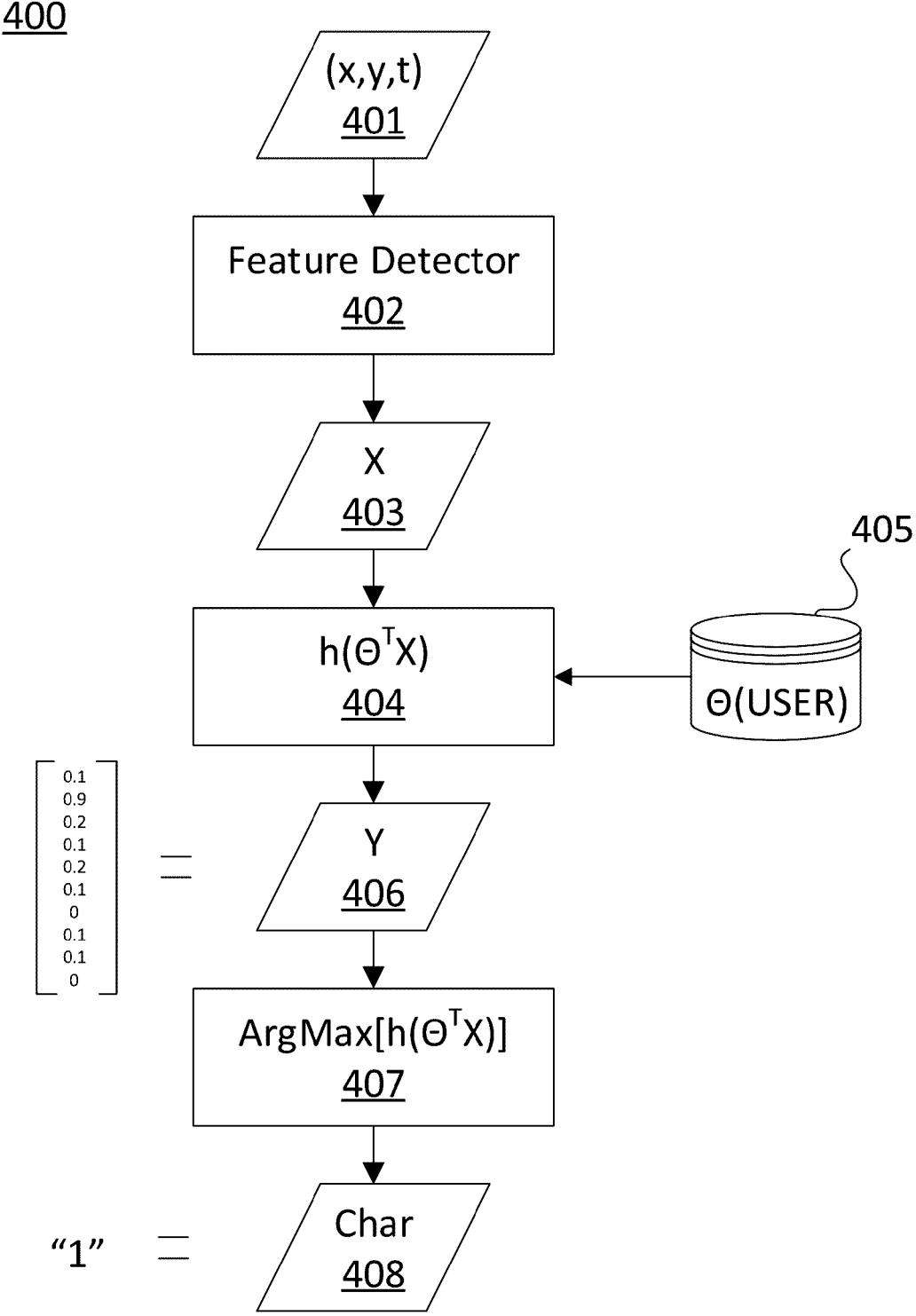
FIG. 4 illustrates a flow chart of a set of methods that can be conducted by a character recognition engine to recognize a character from a set of input data that is in accordance with embodiments of the present disclosure.

FIG. 4 illustrates a block diagram 400 of an exemplary character recognition engine for applying the user-specific cipher to the input data received from a user. In this particular example, the character recognition engine is being applied to recognize a set of numerals entered by the user on a touch screen. As such, the character recognition engine is designed to recognize characters out of the closed set of 10 Arabic numerals. The cipher in this example is user-specific and is downloaded from a data store. With reference back to FIG. 3, this data store can be the data store from which the cipher is downloaded in step 302 and the proper user-specific cipher can be recalled form the data store using the user identification information obtained in step 301.

In block diagram 400, input data 401 is in the form of (x, y, t) coordinates received from stroke detection circuitry on a touch screen. The input data is then provided to a feature detector 402 to be processed into feature vector 403. The feature vector is then provided to a hypothesis function 404 which utilizes a hypothesis vector to generate a prediction vector 406. The hypothesis vector can be represented by the character Θ. The feature vector can be represented by the character X. The prediction vector can be represented by the character Y. The hypothesis function can be a sigmoid or hyperbolic tangent function used to normalize the elements of the prediction vector 406. In this example, the hypothesis vector is downloaded from a data store 405 and is specific to the user. From the prediction vector 406, the character 408 is recognized using a prediction function 407. In this case, the prediction function is a basic ArgMax function that selects the element in the prediction vector Y with the highest value. However, other basic functions can be applied such that a character can be recognized from the prediction vector by identifying an element with one of the largest value or smallest value in the prediction vector. As illustrated, the prediction vector 406 is a vector with ten elements that have been normalized from 0 to 1 where each represents the probability that the input data 401 represents one of the 10 Arabic numerals. In this situation, the prediction vector value for the numeral "1" is the highest, corresponding to the value 0.9 in the prediction vector, and therefore "1" is the character 408 ultimately recognized by the character recognition engine.

Feature detector 402 can take on various forms. In a specific example, the feature detector can be removed and the overall character recognition engine could conduct a naïve prediction. In this situation, block 402 would be replaced by a basic process such as a simple compilation of the sequence of data elements in the input data 401. For example, the data elements could be compiled into a matrix comprising a dimension set by the number of samples obtained and a second dimension set by the number of data elements in each sample. For example, if 1,000 touch points were sampled, the resulting vector fed to the hypothesis function would be a 3×1,000 matrix. However, such a simple approach may not provide sufficient accuracy for the character recognition engine in certain applications. At the same time, feature detector 402 cannot be too complicated because, as will be described in a later section, in certain embodiments the feature detector 402 will be implemented on an embedded system with minimal processing capabilities. In general, any low memory footprint feature detector can be applied in place of feature detector 402.

Low memory footprint feature detectors that perform well in this application include feature detection methods that transfer the input data 401 into a gray scale image and conduct various image processing tasks on the image such as scaling and zooming. Although counterintuitive, feature detectors that apply a blurring process to the image can also produce an improved character recognition engine. In particular, the convolution of a zoomed out, and therefore blurred, version of the image formed by input data 401 along with a zoomed in version of the image is a specific example of a character recognition engine that performs well for the disclosed applications. In addition, the use of a histogram of oriented gradients (HOG) feature detector produces certain beneficial results in that it consumes little memory and provides sufficient accuracy to the overall character recognition engine in this application. Any low memory footprint feature detector, and overall character recognition engine, can be applied to realize the benefits described herein. In particular, a low memory footprint character recognition engine can be instantiated and conducted on a secure processor on a device as described in the following section which provides additional security to the overall procedure.

In FIG. 4, the input to hypothesis function 404 is given as the transpose of a hypothesis vector multiplied by a feature vector. However, any function that took in the feature vector and hypothesis vector as inputs and produced a prediction vector could be substituted in place of that particular function. In addition, although the term "vector" is used to describe these elements the term is not limited in this disclosure to matrixes having at least one dimension of size 1 and can cover matrixes of with any number of dimensions where each is of any size. The character recognition engine is not meant to be limited to logistic regression approaches and can more broadly involve inputs, hypothesis functions, and hypothesis vectors associated with other machine learning algorithms such as SVMs, Native Bayes, or others. In general, the character recognition engine used in step 304 of FIG. 3 can be any system that produces predictions based on feature vectors and prior supervised training.

Hardware Implementation for Device

Specific hardware implementations for devices that can conduct the procedures described above include any free-hand character recognition device. The devices may include a surface or peripheral that accepts free-hand input data from a user and a processing system capable of executing the methods described above in combination with a memory for storing instructions to execute such methods. Specific hardware implementations for these devices may also have one or more modems for communicating via a network with a server. The surface or peripheral can be a capacitive, resistive, optical, or acoustic wave touch screen. The touch screen can include an integrated display and touch array for detecting touch data on the display. The touch screen can accept input in the form of the input data 401 described above. In certain approaches, the touch screen will be able to monitor both the position and the pressure of individual touch points. The peripheral can also be a camera or image capture device that is capable of monitoring a user's gestures to input the free-hand input data. The peripheral can be an integral part of the overall device or it can be a distal peripheral that exchanges information with the overall device via a wireless or wired link. Entry of data via the peripheral or surface could be conducted using a specialized stylus or via bare hands. A specialized stylus could also serve as the peripheral itself by tracking the location of the stylus to an arbitrary frame of reference. Regardless of the characteristics of the peripheral or surface, the overall device to which it is a part will comprise stroke detection circuitry in the form of the peripheral or surface and a controller that interprets and preprocesses the data. The controller will generally be an ASIC designed specifically for the given input device. The processing system can comprise one or more processors implemented on an integrated circuit (IC). The memory can either be an external memory accessible to the processing system via an external bus, or it can be integrated on the same chip as one or more elements of the processing system itself.

Figure 5:
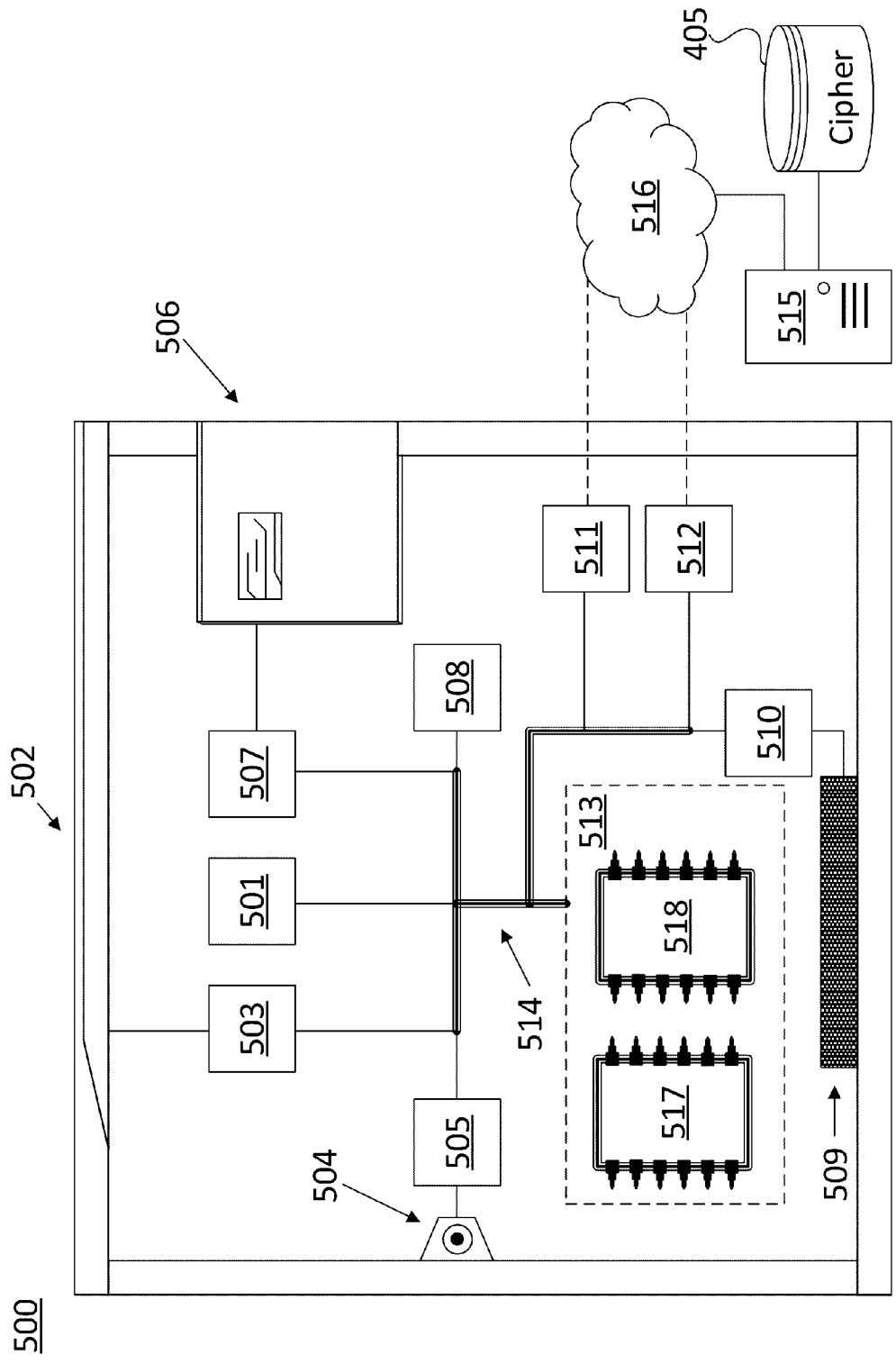
FIG. 5 illustrates a conceptual block diagram of a device capable of executing the methods of FIGS. 3 and 6 in accordance with embodiments of the present disclosure.

FIG. 5 illustrates a specific implementation of a device for conducting the methods described above in the form of a POS terminal 500. As illustrated, a touch screen of the POS terminal has been removed to expose the internal components of the device. The touch screen serves as an input device for the terminal to accept input data from a user. The touch array of the touch screen works in combination with touch controller 501 to provide stroke detection circuitry to POS terminal 500 and accept input data from a user of the terminal. The terminal also includes additional controllers for various additional peripherals and input devices. The terminal also includes a magnetic stripe card reader 502 and an accompanying controller 503, a camera 504 and its accompanying controller 505, a chip card reader 506 and its accompanying controller 507, an NFC reader and its accompanying controller 508, and a speaker 509 and its accompanying controller 510. Notably, the NFC reader itself is not shown because it has been removed to expose the internal components of the terminal. The device also includes a network connection to a server. In the illustrated example, the device includes two separate network connections in the form of two modems: cellular communication modem 511 and wireless local area network modem (WLAN) 512. As a non-limiting example, W-LAN modem 512 could be a Wi-Fi modem and cellular communication modem 511 could be a 3G or 4G LTE modem. Alternative modems could be used in place of these specific modems including Ethernet modems or other forms of wired networking modems. All of these devices communicate with processing system 513 via a bus 514.

Terminal 500 can communicate with server endpoint 515 via a network 516 using modem 511 and 512. Server endpoint 515 can include or communicate with an authorization system to provide authorizations for financial transactions conducted on terminal 500. Server endpoint 515 can also access external data store 405 and obtain a user-specific cipher for use in a character recognition engine implemented using processing system 513. Network 516 can include one or more networks which could include wireless or wired networks, and the Internet. Server endpoint 515 is drawn as one server. However, in certain applications, terminal 500 will communicate with multiple separate servers. For example, the authorization system may be provided by an entirely separate system than the server endpoint that provides the user-specific cipher to the terminal. The authorization system could communicate with the terminal via a network connection to a payment processor's servers while the authorization system could be provided by the servers of an administrator of the terminal network.

POS terminal 500 includes a processing system and a memory. Processing system 513 can be one or more processor implemented on IC(s). Processing system 513 can execute the processes described herein in combination with a memory such as a random access memory (RAM) located in POS terminal 500 and on-board nonvolatile memory (NVM) such as a flash memory on the same IC as a processor. The memory can serve both as a working space for executing the process and as a non-transitory computer-readable medium for storing the instructions necessary to implement the process. For example, the memory may store instructions to execute the method described with reference to FIG. 3, which can then be executed by processing system 513. Also, the memory that is used by the processing system to execute the instructions could be the same memory or an alternative memory.

Processing system can also include a split architecture comprising a secure processor and a general processor. For example, processing system 513 can include secure processor 517 and general processor 518. The two processors can have access to separate memory spaces of the memory, and access to the secure processors' memory space may be completely controlled by secure processor 517. The processing system can include an application processor implemented on an IC and the memory that stores the instructions may be an on-board NVM located on the same IC. The memory that stores the instructions could also be an external NVM or RAM.

Processing system 513 can be used to instantiate a character recognition engine for the terminal in combination with a data store. The data store can be a portion of the memory. In particular, the data store can be a reserved and secure section of the memory such as the portion of the memory that can only be accessed by the secure processor and cannot be accessed by the general processor. Furthermore, the secure processors' memory space may include both the instructions and data needed to instantiate the character recognition engine. The character recognition engine can exhibit the characteristics described above with reference to FIGS. 3-4. The data store in the secure portion of the memory can store all of the instructions and data involved in implementing the character recognition engine including the cipher once it is downloaded from external data store 405, the character data 408, and the feature detector 402. Implementing the feature detector using the secure processor provides certain benefits in that unknown complexity in the feature detector makes the system less susceptible to hacking. Even if the input data 401 and the cipher are illicitly obtained, it is still not possible to determine the character data 408 without also being able to recreate the feature detector.

All of the sensitive data utilized by terminal 500 can be stored on the portion of the memory space that is only accessible to secure processor 517. In addition, the data can be locally encrypted and sent out through and received from network 516 in encrypted form such that application processor 518 never has the ability to intercept the information in a vulnerable form. Information from the various input devices and peripherals can also be sent directly to the secure processor 517 for the same reason. For example, the user identification information obtained in step 301, the cipher downloaded in step 302, and the characters recognized in step 304 can all be stored in the secure processors' memory space and be encrypted and decrypted using the secure processor so that they can be transferred securely to and from external server endpoints. The data can be encrypted using a MD5 or SHA-256 algorithm. In particular, the user identification information can be encrypted and a hash of that information can be sent to server 515 to pull the cipher from an external data store.

Speaker 509 on POS terminal 500 can be used to provide auditory cues to the user while interacting with the POS terminal 500. This is a particularly important feature for facilitating use of the terminal by those that are visually impaired. Speaker 509 can provide instructions to the user in sequence with a change in the user interface to instruct the user to enter different information at different times. For example, speaker 509 can instruct the user to hand their payment card to a clerk or to draw a single character on the touch screen. A bell or ring sound can be played whenever a character has been drawn and accepted by the stroke detection circuitry. In specific approaches, the device will issue a consistent auditory cue whenever the user is inputting touch data outside the scope of a user interface provided on the device. In alternative approaches, speaker 509 will issue a continuous auditory cue generated by processing system 513 so long as the touch screen is receiving touch data on the target region. Either set of approaches could be combined with a verbal cue issued when the user transitions between inputting touch data outside and inside of that user interface.

Figure 6:
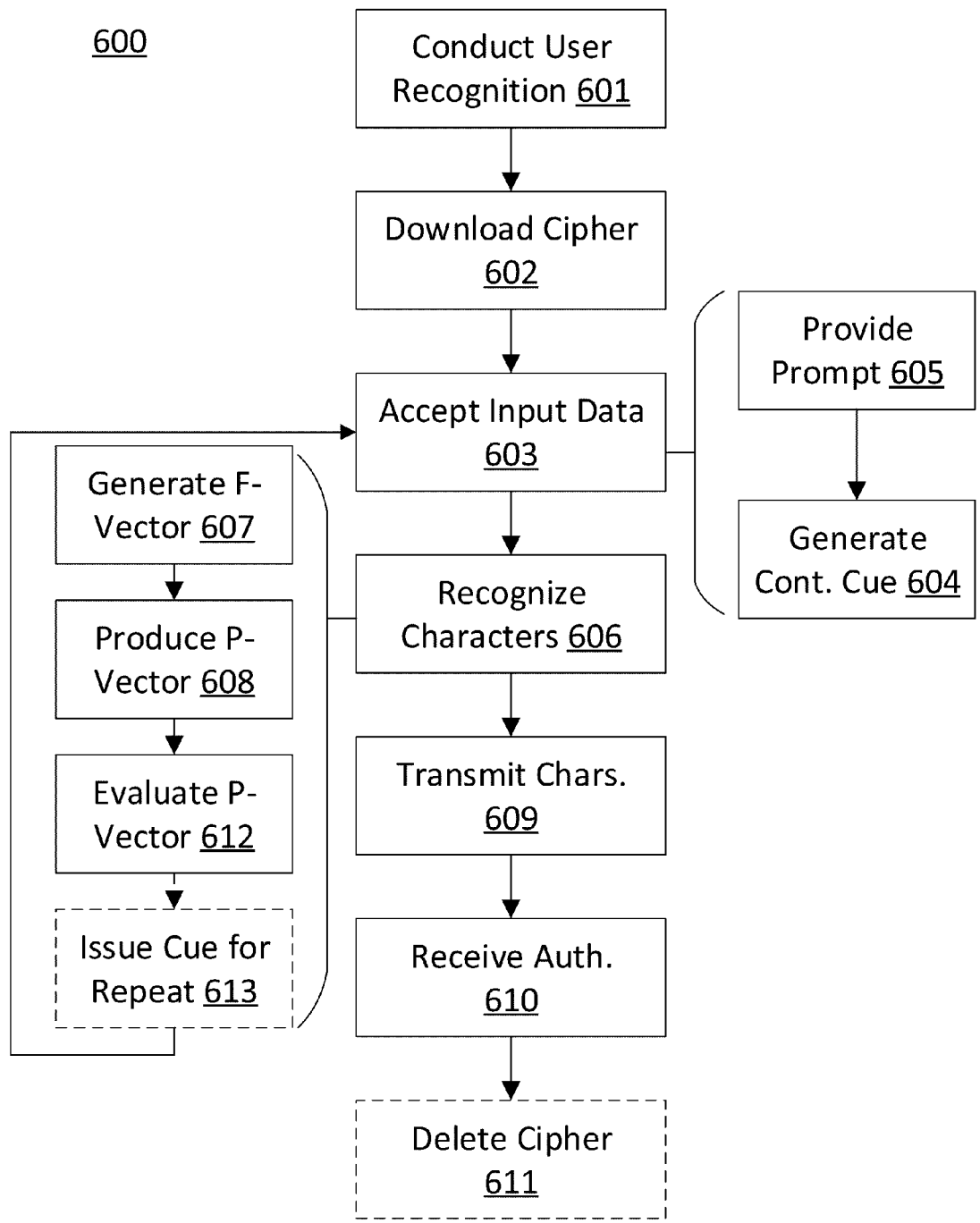
FIG. 6 illustrates a flow chart of a set of methods that can be conducted in combination with the device of FIG. 5 in accordance with embodiments of the present disclosure.

FIG. 6 illustrates a flow chart 600 of computer-implemented methods that can be executed by a device, such as POS terminal 500, either alone or in combination with other computing devices. The other computing devices could be server end point 515 or alternative servers such as those required to authorize a payment transaction conducted using POS terminal 500.

Step 601 involves conducting an unobtrusive user recognition procedure, using processing system 513 and an input device to obtain a user identifier from a user. The processing system can be secure processor 517 alone, secure processor 517 operating with general processor 518, or a single processor if processing system 513 is implemented without a secure processor. The unobtrusive user recognition procedure conducted in step 601 can obtain the user identifier as part of an input device that is used in a payment transaction on the point of sale terminal. For example, the magnetic stripe card reader 602 could obtain the user identifier in the form of the user's name or account number encoded on a magnetic stripe of a payment card. As another example, NFC controller 508 could obtain the same information from the NFC reader via a user's smartphone or other NFC enabled device. As another example, camera 504 could be used in the unobtrusive user recognition procedure. In this case, the user identifier would be an image of the user. The image could be sent up to server endpoint 515 for image recognition processing to be conducted on the image, although preprocessing may be conducted using processing system 513 such as an image segmentation, refinement, and compression procedure. As another example, the touch screen or a physical button on POS terminal 500 could include an embedded fingerprint sensor and the user identifier could be a fingerprint of the user.

Step 602 involves downloading a cipher from a server to a data store, where the cipher is provided from the server in exchange for the user identifier obtained in the unobtrusive user recognition procedure, and where the cipher uniquely corresponds to the user identifier. The downloading can be conducted using a processing system, such as processing system 513, in combination with one or more network connections, such as those provided by modems 511 and 512. As mentioned previously, the user identifier can be encrypted before being sent from a secure portion of processing system 513 up to server end point 515. The cipher that is returned from the server can likewise be provided in encrypted form and decrypted by the secure portion of processing system 513. Data store 405 can store numerous user-specific ciphers and provide the appropriate cipher by using the user identifier as a key in a relational database which links the user identifier and the user-specific cipher associated with that user. On later iterations of the method, the secure processing system can first check a secure portion of the memory on the device to determine if the cipher is locally available. As a specific example, a user that makes repeat transactions with a given POS terminal such as POS terminal 500 may have their own user-specific cipher stored on the secure portion of the memory on terminal 500 left over from a prior use of that specific POS terminal 500. After conducting step 601, processing system 513 can check to determine if the cipher is available from the memory on POS terminal 500 before attempting to download the cipher from an external server.

Step 603 involves accepting input data from a user, using the processing system, a touch screen, and stroke detection circuitry. The input data will represent free-hand characters drawn on the touch screen. Step 603 can involve a sub-step of displaying a target region on the touch screen, and a sub-step 604 of generating a continuous auditory cue so long as the device is receiving touch data on the target region. The continuous auditory cue can be generated by processing system 513 and be produced at speaker 509. The auditory cue could alternatively be continuously provided as long as touch inputs are outside of the target region. Step 603 can also involve a sub-step of 605 involving providing a prompt to the user to draw a character using a speaker. Steps 604 and 605 can be conducted in sequence and repeated numerous times to coach a visually impaired person through the process of entering the input data that represents the characters they need to enter into the POS terminal.

Step 606 involves recognizing —using the processing system, a character recognition engine, the input data, and the cipher—at least two characters entered by the user via the touch screen. If POS terminal 500 is implemented with a processing system 513 having a secure portion, step 606 can be executed by the secure portion. Step 606 can involve sub-steps 607 of generating a feature vector using the input data and a feature detector. Step 606 can also involve sub-step 608 of applying the product of the feature vector and the cipher to a hypothesis function to product a prediction vector. These sub-steps can be conducted in accordance with steps 402 and 404 respectively.

Step 609 involves transmitting the recognized characters to a server. For example, the characters can be transmitted from POS terminal 500 through network 516 to server endpoint 515. Alternatively, the characters can be transmitted to an alternative server that is provided by a payment processor. In either case, the characters can be locally encrypted by a secure portion of processing system 513 before they are transmitted through network 516. The characters can then be validated by a server against a stored password. In step 610, an authorization for a transaction is received in response to a validation of the characters. The transaction can be a payment transaction that is being conducted via POS terminal 500.

Step 611 involves deleting the cipher from the data store upon receiving an indication that a financial transaction has been completed. The indication can be the receipt of the authorization from the authorizing server from step 610. The step 611 is shown using hashed lines to indicate that it is optional. As mentioned previously, in certain approaches the cipher is retained locally for later use by the same user. Certain benefits accrue to this approach in terms of increased speed and less weight placed on server endpoint 515. In addition, the cipher generally does not consume a large amount of memory so even with the constraints placed on having a secure memory, a large number of ciphers can be stored on any given device. A FIFO system can be set up to delete ciphers, or a weighting system based on frequency of use can be applied to prioritize and retain certain ciphers. Finally, server endpoint 515 can administrate a clean-up process on a periodic basis to delete subsets of ciphers from subsets of devices that are in communication with server endpoint 515.

In the above example, the device is a specialized POS terminal used to conduct a transaction with a user. However, the device may be any hardware device that can be used to conduct a financial transaction—including generic tablets with financial transaction software installed and highly specialized automated teller machines. In addition, although a purchase transaction was used as an example, the transaction that is approved through verification of the entered characters can include a balance inquiry, a fund deposit, a fund transfer request, a withdrawal request, or any other transaction involving the exchange of funds or sensitive financial information.

Training and User Configuration System

A user may be able to configure their experience with the character recognition devices described above through the use of one or more user configuration applications that allow the user to configure a threshold of the character recognition engine, their identification information, and their user-specific cipher. The application can be provided on a training device which is used to produce the user-specific cipher. Training devices include any computing device with a touch screen or a similar input device to the character recognition device on which the user will enter their characters. The training device could be a POS terminal. In addition, the training procedure may be conducted the first time a user attempts to check out using a POS terminal with a character recognition engine. Alternatively, the application can be provided via a generic web portal that can be accessed by any computing device regardless of any attached input devices or peripherals.

When hand-drawn characters are input to a character recognition device there is a chance for characters to be incorrectly identified. Someone in a rush may draw a "7" that looks like a "1." To prevent incorrect identification, a threshold level of the character recognition device can be set such that if a character is not recognized within a desired level of certainty, the character recognition engine issues a failed classification indication instead of a character. To use a specific example, with a prediction vector having values normalized from 0 to 1 with a 1 representing absolute certainty, the threshold could be set to 50% such that if none of the elements in the prediction vector had values in excess of 0.5, a failed classification indication would be provided instead of a best, but inaccurate, guess. Notably, an increased threshold also increases the security of the system because someone attempting to mimic a user's characters will be held to a high level of precision. However, the threshold cannot be set arbitrarily high because hand-drawn characters always exhibit some degree of variation and a best guess is often correct. As a result, an arbitrarily high threshold will needlessly ask a user to input a character again even when the character was properly identified. Therefore, the user configuration application can allow a user to set a personalized threshold that is best for their own drawing style to minimize both false recognition errors and needless requests for repeat entries.

Processes illustrated by flow chart 600 in FIG. 6 can be modified to accommodate a threshold determination through the addition of an optional step 613. In step 612 the prediction vector produced in step 608 is evaluated to determine which character is most likely represented by the input data. However, step 612 can also involve evaluating the prediction vector step to determine if each element of the prediction vector falls below the threshold value of the character recognition engine. This threshold value is the value that can be set by the user. In optional step 613, an auditory cue can be issued to notify the user of a need to repeat the entry of input data. In a specific example, step 613 involves an auditory cue telling the user to draw the same character again using the touch screen or other input device. More generally, step 612 can be followed by the issuance of a failed classification indication.

The user configuration application or applications can also facilitate a training procedure to develop a user-specific cipher. In particular, the configuration application can be used to create a user-specific hypothesis vector. The training procedure can involve interaction with an application that can be downloaded to a user's smart phone, tablet, or other training device. The application can also be provided to the user in a store at a POS terminal. The training procedure can involve presenting auditory cues to a user to draw specific characters using a peripheral. The procedure can involve drawing each character in a known set of characters at least once and possible multiple times. The training data can be uploaded from the device in which the training was conducted and stored as hashed values on a data store such as data store 405.

Figure 7:
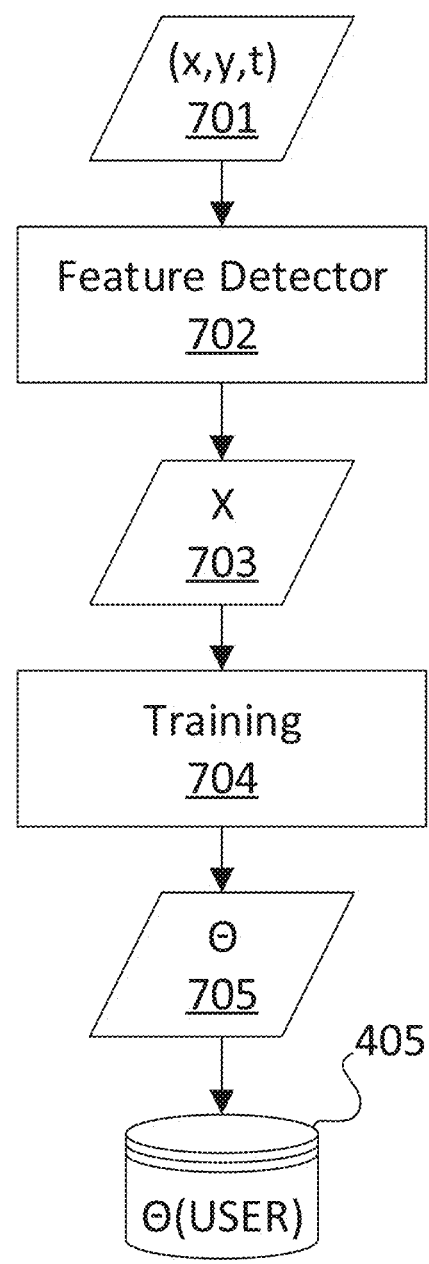
FIG. 7 illustrates a flow chart of a set of methods that can be conducted by a computing device to train a user-specific character recognition engine to recognize a character from a set of input data that is in accordance with embodiments of the present disclosure.

FIG. 7 illustrates a block diagram 700 of an exemplary training engine for producing the user-specific hypothesis vector. The training engine can involve receiving training data 701 from the user in response to the prompt. The training data 701, and the method of collection thereof, can exhibit all of the characteristics of that for input data 401 in FIG. 4. The training data can be applied directly to a training engine 704 or indirectly through a feature detector 702 in the form of a feature vector 703. The feature detector 702 should necessarily exhibit the same characteristics as the feature detector 402 for the character recognition that is being trained for. The training engine can utilize any form of logistic regression. Furthermore, the training engine can utilize any form of supervised training procedure such that a target value associated with the prompt will be applied with the training data. In other words a digital representation of the number "1" can be provided to the training engine if the prompt to the user requested that they draw their character for the number "1." The output of the training engine is the user-specific hypothesis vector 705 which can be uploaded in an encrypted or hashed format to data store 405.

Depending upon the characteristics of the character recognition engine to which it is paired, the training engine can involve any corresponding machine learning technique including SVM or Naïve Bayes. Indeed, any supervised training approach operating on feature vectors and training data can be applied in place of the training engine in FIG. 7 so long as it matches the character recognition engine for which it is designed to produce a hypothesis vector.

The user configuration application or applications can also be used to upload the user identifier to the system so that it can be used at a later date to catalogue and retrieve the appropriate user-specific cipher. For example, a point of sale terminal running the application and equipped with a camera could take a picture of the user as part of an enrollment process with the system. As another example, a user could use their smart phone or table to enroll by submitting a picture or other user identifier on their own. The user could upload a picture, fingerprint, or other biometric information to be stored with the system using the application or applications. This information could be obtained from the user as part of the training procedure. Alternatively, a payment system associated with the application could already have an appropriate user-identifier for the user when they conduct the training procedure and might not need to obtain further information from the user in order to appropriately store and retrieve the user-specific cipher.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the scope of the present invention, which is more particularly set forth in the appended claims.

What is claimed is:

1. A free-hand character recognition device comprising:
    an input device having stroke detection circuitry to accept input data from a user;
    a character recognition engine instantiated using a processing system and a data store;
    a network connection to a server; and
    a memory storing instructions to:
        conduct a user recognition procedure to obtain a user identifier from the user;
        download a cipher from the server to the data store using the network connection and in exchange for the user identifier;
        generate a prediction vector using the character recognition engine, the input data, and the cipher; and
        recognize using the character recognition engine, the input data, and the cipher, at least two characters entered by the user via the touch screen;
        wherein the user recognition procedure further comprises:
        generating a feature vector using the input data and a feature detector; and
        applying a product of the feature vector and the cipher to a hypothesis function to generate the prediction vector;
        wherein the cipher is user-specific; and
        wherein the cipher is a hypothesis vector.

2. The free-hand character recognition device of claim 1, wherein:
    the free-hand character recognition device is a point of sale terminal;
    the user recognition procedure is an unobtrusive user recognition procedure and obtains the user identifier as part of a payment transaction on the point of sale terminal;
    the input device is a touch screen;
    the stroke detection circuitry is a touch array and a touch screen controller;
    the processing system includes a processor on an integrated circuit;
    the memory is a nonvolatile memory on the integrated circuit;
    the cipher is user-specific;
    the cipher is a hypothesis vector for the character recognition engine; and
    the character recognition engine includes a feature detector.

3. The free-hand character recognition device of claim 2, further comprising:
    a magnetic stripe card reader;
    wherein the magnetic stripe card reader is used in the unobtrusive user recognition procedure; and
    wherein the user identifier is an account number.

4. The free-hand character recognition device of claim 2, further comprising:
    an near field communication reader;
    wherein the near field communication reader is used in the unobtrusive user recognition procedure; and
    wherein the user identifier is an account number.

5. The free-hand character recognition device of claim 2, further comprising:
    a speaker;
    wherein the memory stores instructions to:
    display a target region on the touch screen; and
    generate a continuous auditory cue so long as the target region is receiving touch data.

6. The free-hand character recognition device of claim 5, further comprising:
    a camera;
    wherein the camera is used in the unobtrusive user recognition procedure.

7. The free-hand character recognition device of claim 2, wherein:
    the feature detector is a histogram of gradients feature detector; and
    a character is recognized from the prediction vector by identifying an element with one of a largest value or a smallest value in the prediction vector.

8. The free-hand character recognition device of claim 2, wherein the memory stores instructions to:
    delete the cipher from the data store upon receiving an indication that a financial transaction has been completed.

9. The free-hand character recognition device of claim 1, wherein:
    the free-hand character recognition device is a point of sale terminal;
    the user recognition procedure obtains the user identifier as part of a payment transaction on the point of sale terminal;
    the input device is a touch screen; and
    the memory is a nonvolatile memory on an integrated circuit.

10. The free-hand character recognition device of claim 9, wherein:
    the data store is a reserved and secure section of the memory.

11. The free-hand character recognition device of claim 9, wherein:
    the processing system has a secure processor and a general processor;
    a portion of the memory can only be accessed by the secure processor and cannot be accessed by the general processor; and
    the character recognition engine is instantiated by the secure processor and the portion of the memory.

12. A computer-implemented method comprising:
    conducting a user recognition procedure, using a processing system and an input device, to obtain a user identifier from a user;
    downloading a cipher from a server to a data store, wherein the cipher is provided from the server in exchange for the user identifier obtained in the unobtrusive user recognition procedure, and wherein the cipher uniquely corresponds to the user identifier;

accepting input data from the user, using the processing system, a touch screen, and stroke detection circuitry; and recognizing, using the processing system, a character recognition engine, the input data, and the cipher, at least two characters entered by the user via the touch screen;

wherein the recognizing further comprises:

generating a feature vector using the input data and a feature detector; and applying a product of the feature vector and the cipher to a hypothesis function to produce a prediction vector;

wherein the cipher is user-specific; and wherein the cipher is a hypothesis vector.

13. The computer-implemented method of claim 12, further comprising:

providing a prompt to the user to draw one of the at least two characters using a speaker;

receiving training data from the user in response to the prompt; and applying the training data and a target value associated with the prompt to a logistic regression training engine to produce the hypothesis function.

14. The computer-implemented method of claim 13, wherein:

the speaker is located on a training device;

the logistic regression training engine is instantiated on the training device;

the touch screen is located on a point of sale terminal; and the character recognition engine is instantiated on the point of sale terminal.

15. The computer-implemented method of claim 14, further comprising:

accepting a threshold value from the user via the training device;

evaluating the prediction vector to determine if each element of the prediction vector falls below the threshold value; and issuing an auditory cue to notify the user of a repeat of the accepting step based on a result of the evaluating step.

16. The computer-implemented method of claim 12, wherein:

the user recognition procedure is unobtrusive and obtains the user identifier as part of a payment transaction on a point of sale terminal; and the stroke detection circuitry is a touch array and a touch screen controller located on the point of sale terminal.

17. The computer-implemented method of claim 16, further comprising:

providing a prompt to the user to draw one of the at least two characters using a speaker;

receiving training data from the user in response to the prompt; and applying the training data and a target value associated with the prompt to a logistic regression training engine to produce the hypothesis function.

18. The computer-implemented method of claim 16, wherein:

the input device is a magnetic stripe card reader; and the user identifier is an account number.

19. The computer-implemented method of claim 16, further comprising:

the input device is a near field communication reader; and the user identifier is an account number.

20. The computer-implemented method of claim 16, further comprising:

displaying a target region on the touch screen; and generating a continuous auditory cue using a speaker so long as the target region is receiving touch data.

21. The computer-implemented method of claim 16, wherein:

the input device is a camera.

22. The computer-implemented method of claim 16, wherein:

the character recognition engine further comprises a hypothesis function that produces a prediction vector;

the feature detector is a histogram of gradients feature detector; and one of the at least two characters is recognized from the prediction vector by identifying an element with one of a largest value or a smallest value in the prediction vector.

23. The computer-implemented method of claim 16, further comprising:

deleting the cipher from the data store upon receiving an indication that a financial transaction has been completed.

24. A point of sale terminal comprising:

a touch screen having stroke detection circuitry to accept input data from a user;

a character recognition engine instantiated using a processing system and a data store;

a network connection to a server; and a memory storing instructions to:

conduct a user recognition procedure to obtain a user identifier from the user;

download a hypothesis vector from the server to the data store using the network connection and in exchange for the user identifier;

generate a prediction vector using the character recognition engine, the input data, and the hypothesis vector; and recognize using the character recognition engine, the input data, and the hypothesis vector, at least two characters entered by the user via the touch screen;

wherein the user recognition procedure further comprises:

generating a feature vector using the input data and a feature detector; and applying a product of the feature vector and the hypothesis vector to a hypothesis function to produce a prediction vector;

wherein the hypothesis vector is a user-specific cipher.

* * * * *